(12) United States Patent
Kawada et al.

(10) Patent No.: US 7,068,304 B2
(45) Date of Patent: Jun. 27, 2006

(54) APPARATUS FOR ASSESSING QUALITY OF A PICTURE IN TRANSMISSION, AND APPARATUS FOR REMOTE MONITORING QUALITY OF A PICTURE IN TRANSMISSION

(75) Inventors: Ryoichi Kawada, Tokyo (JP); Masahiro Wada, Kanagawa (JP); Shuichi Matsumoto, Tokyo (JP)

(73) Assignee: KDDI Corporation, Tokyo (JP)

( * ) Notice: Subject to any disclaimer, the term of this patent is extended or adjusted under 35 U.S.C. 154(b) by 847 days.

(21) Appl. No.: 09/934,539

(22) Filed: Aug. 23, 2001

(65) Prior Publication Data

US 2004/0160622 A1    Aug. 19, 2004

(30) Foreign Application Priority Data

Aug. 25, 2000 (JP) .............................. 2000-256015

(51) Int. Cl.
*H04N 17/00* (2006.01)
(52) U.S. Cl. ..................................................... 348/192
(58) Field of Classification Search ........ 348/192–194, 348/180; 455/67.1, 67.3, 67.7; 714/819–821
See application file for complete search history.

(56) References Cited

U.S. PATENT DOCUMENTS

| | | | | | |
|---|---|---|---|---|---|
| 4,639,779 | A * | 1/1987 | Greenberg | .................. | 348/460 |
| 5,446,492 | A * | 8/1995 | Wolf et al. | ................. | 348/192 |
| 5,596,364 | A * | 1/1997 | Wolf et al. | ................. | 348/192 |
| 5,808,671 | A * | 9/1998 | Maycock et al. | ........... | 348/180 |
| 6,002,671 | A * | 12/1999 | Kahkoska et al. | .......... | 370/248 |
| 6,075,561 | A * | 6/2000 | Janko | ......................... | 348/180 |
| 6,246,435 | B1 * | 6/2001 | Patel | .......................... | 348/192 |
| 6,297,845 | B1 * | 10/2001 | Kuhn et al. | ................. | 348/192 |
| 6,366,314 | B1 * | 4/2002 | Goudezeune et al. | ....... | 348/192 |
| 6,496,221 | B1 * | 12/2002 | Wolf et al. | ................. | 348/192 |
| 6,512,538 | B1 * | 1/2003 | Hollier | ....................... | 348/192 |
| 6,603,505 | B1 * | 8/2003 | Kawada et al. | ............. | 348/192 |
| 6,772,392 | B1 * | 8/2004 | Kawada et al. | ............. | 714/820 |
| 6,943,827 | B1 * | 9/2005 | Kawada et al. | ............. | 348/180 |

OTHER PUBLICATIONS

Hamada et al.; "Picture Quality Assessment System By Three-Layered Bottom-Up Noise Weighting Considering Human Visual Perception";*SMPTE Journal*; Jan. 1999; pp 20-26.

\* cited by examiner

*Primary Examiner*—Paulos M. Natnael
(74) *Attorney, Agent, or Firm*—Westerman, Hattori, Daniels & Adrian, LLP.

(57) ABSTRACT

In a transmission chain having series-connected a TSC unit, an encoder, a transmission path, a decoder, and an up-converter, characteristic value extracting units are connected to input/output points A, B, C, and D of these transmission processing units respectively. Each characteristic value extracting unit extracts characteristics like an average value m and a variance $\sigma^2$ of luminance of a picture, for example. These characteristic values are transmitted to a central monitoring unit via a low-speed line. A characteristic value comparator compares the characteristic values. When a difference equal to or larger than a predetermined threshold value has occurred in the characteristic values, the characteristic value comparator decides that an abnormality has occurred in the image in transmission. According to the present invention, it is possible to provide an apparatus for assessing quality of a picture in transmission and an apparatus for remote-monitoring picture quality of a picture in transmission that are capable of assessing the picture quality of a transmission picture in high precision, during an actual transmission of the picture.

4 Claims, 2 Drawing Sheets

(FOR EACH FIELD)

(FOR EACH BLOCK)

(FOR EACH COLLECTIVE BLOCK)

APPARATUS FOR ASSESSING QUALITY OF A PICTURE IN TRANSMISSION, AND APPARATUS FOR REMOTE MONITORING QUALITY OF A PICTURE IN TRANSMISSION

BACKGROUND OF THE INVENTION

1. Field of the Invention

The present invention relates to an apparatus for assessing quality of a picture in transmission that assesses the picture quality based on characteristics of the picture obtained at each transmission processing point, and an apparatus for remote monitoring quality of a picture in transmission that collectively remote-monitors at the center the quality of a picture in transmission, in a system having a plurality of transmission processing devices connected in series to a transmission path.

2. Description of the Related Art

Conventionally, there are broadly two types of methods for assessing quality of a transmitted picture. They are (1) a method of assessing the picture quality based on a comparison between a processed picture and an original picture, and (2) a method of assessing the picture quality based on only a processed picture. A prior art of the method (1) is described in detail in the following document, for example.

T. Hamada, et al.: "Picture quality assessment system by three-layered bottom up noise weighting considering human visual perception", SAMPTE Journal, Vol. 108, No. 1, January 1999.

However, it is not possible to use the above method (1) in the actual field of picture transmission. This is because it is possible to obtain a processed picture, but not possible to obtain an original picture, during the actual transmission of a picture. Therefore, only the above method (2) can be used in the actual field of picture transmission. However, this method (2) has had a problem in that the precision of the picture assessment is low, as the picture quality is assessed based on only the processed picture.

SUMMARY OF THE INVENTION

It is an object of the present invention to provide an apparatus for assessing quality of a picture in transmission and an apparatus for remote-monitoring quality of a picture in transmission that are capable of assessing quality of a transmitted picture in high precision, during an actual transmission of the picture.

To accomplish the object, the first aspect of the present invention resides in that an apparatus for assessing quality of a picture in transmission on a picture transmission path having a plurality of transmission processing units connected in series comprises means for extracting characteristic values of a picture transmitted on the picture transmission path at predetermined points on the picture transmission path, wherein the apparatus assesses the picture quality of the picture based on the characteristic values of the picture.

According to the first aspect of the present invention, picture quality of a picture is assessed based on characteristics of the picture that is in the course of a transmission. Therefore, as compared with the conventional method of assessing the picture quality based on only a processed picture, the method according to the present invention can improve the precision of the picture quality assessment.

The second aspect of the present invention resides that an apparatus for remote-monitoring quality of a picture in transmission that monitors quality of a picture in transmission on a picture transmission path having a plurality of transmission processing units connected in series comprises means for extracting characteristic values of a picture transmitted on the picture transmission path at predetermined points on the picture transmission path; transmission means for transmitting characteristic values extracted by the characteristic value extracting means, from each of the points to a central monitoring unit at a low bit rate; and the central monitoring unit for deciding whether an abnormality has occurred in the picture quality or not, based on the characteristic values transmitted from the respective points by the transmission means.

According to another aspect of the present invention, only the important information (characteristics) on the picture quality of a picture is extracted at each point, and the information volume is small. Therefore, it is possible to transmit this information to a central monitoring unit by using a low-speed line. The central monitoring unit can collect sufficient information for monitoring the picture quality of a picture in transmission at each point. Therefore, by comparing the collected information, it is possible to specify an occurrence of an abnormality and a point of the occurrence of the abnormality. As a result, it is possible to realize an automatic remote monitoring apparatus for monitoring picture quality of a picture in transmission.

DETAILED DESCRIPTION OF THE PREFERRED EMBODIMENTS

Figure 1:
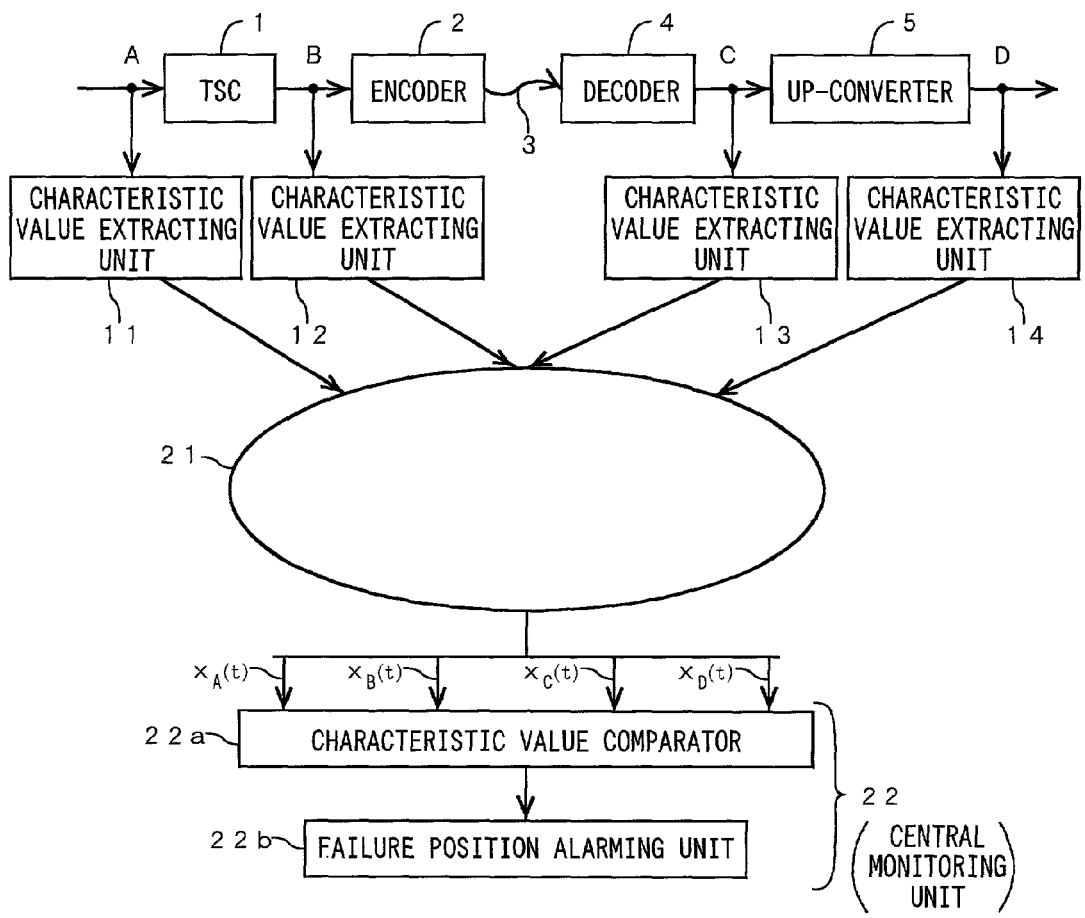
FIG. 1 is a block diagram showing an outline structure of one embodiment of the present invention.

The present invention will be explained in detail below with reference to the drawings. FIG. 1 is a block diagram showing one embodiment of an apparatus for remote-monitoring picture quality of a picture in transmission according to the present invention that is applied to a system having a plurality of transmission processing devices connected in series to a transmission path (hereinafter to be referred to as a picture transmission chain).

In FIG. 1, the picture transmission chain consists of a TSC unit (a television standard converter) 1, an encoder 2, a transmission path 3, a decoder 4, and an up-converter 5.

The TSC unit 1 is a unit for converting the PAL system used in Europe to the NTSC system used in Japan, for example, in the television international transmission. At the time of this conversion, the number of lines and the number of frames of one system are converted to those of another system. The picture quality is degraded along this conversion. The encoder 2 compresses a picture, and transmits the compressed picture to the transmission path 3 as a compressed bit stream. The decoder 4 receives the compressed bit stream transmitted via the transmission path 3, and decodes the picture into the original picture. At this time, coding degradation occurs. When the compressed bit stream passes through the transmission path 3, a transmission path error may occur and the picture quality is degraded, depending on the line status of the transmission path 3. The up-converter 5 converts the standard television to the high-definition television. For example, the up-converter 5 converts the SDTV signal having 525 lines to the HDTV signal having 1,125 lines. At the time of this conversion, there is a possibility of the occurrence of the picture degradation.

Assume that the input picture/output pictures at each of the processing units 1, 2, 3, 4, and 5 are monitored. The picture quality of a picture in transmission is monitored at four points of A, B, C, and D. Characteristic value extracting units 11, 12, 13, and 14 are connected to the points A, B, C, and D, respectively. Each of the characteristic value extracting units 11 to 14 extracts characteristics like an average value m and a variance $\sigma^2$ of luminance from each field of a moving picture, and transmits these characteristic values by using a low-speed line (for example, 64 kbps). A telephone network or a LAN can be used as this low-speed line.

Figure 2A:
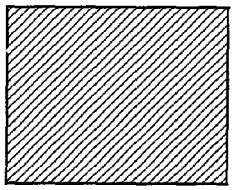
FIGS. 2A, 2B and 2C are a diagram showing a picture unit for extracting characteristics.
Figure 2B:
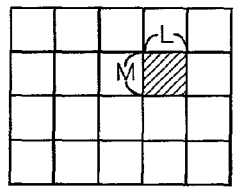
Figure 2C:
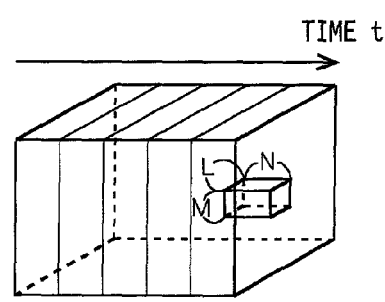

Each of the characteristic value extracting units 11 to 14 calculates these characteristic values (1) for each field, (2) for each of a large number of blocks obtained by dividing the field, or (3) for each collective block of the block in (2) over a plurality of fields, as shown in FIGS. 2A to 2C respectively. For example, when the block in (2) has L pixels×M lines as shown in FIG. 2B, the collective bock in (3) becomes L pixels×M lines×N fields as shown in FIG. 2C.

The above characteristic values (the average value m, and the variance $\sigma^2$) are one example. It is also possible to use other characteristic values that are described, for example, in "American National Standard, for Telecommunications-Digital Transport of One-Way Video Signals-Parameters for Objective Performance Assessment", ANSI T1. 801.03-1996, published by American National Standards Institute.

The characteristic values outputted from each of the characteristic value extracting units 11 to 14 connected to the points A, B, C, and D are sequentially transmitted in real time to a central monitoring unit (central monitoring room) 22 via a low-speed line 21. The central monitoring unit 22 has a characteristic value comparator 22a, and a failure position alarming unit 22b.

Among the above four monitoring points of A, B, C, and D, the processing delay between the points A and B (between the input and the output of the TSC unit 1), and the processing delay between the points C and D (between the input and the output of the up-converter 5) are usually not so large, and the processing delay is about one frame. However, the section between the points B and C (that is, between the input end of the encoder 2 and the output end of the decoder 4) involves the processing time of the encoder 2 and the decoder 4, and the transmission path delay (this delay is large particularly in the case of satellite communications). The processing delays of the encoder 2 and the decoder 4 are different depending on the units, and the delay is usually about one second. The delay in the satellite communication path is about 0.5 second. When the low-speed line for transmitting the characteristic values from the monitoring points A to D to the central monitoring unit 22 is an IP network instead of the telephone line, the delay time of this low-speed line cannot be neglected.

Therefore, it is difficult to know in advance when the characteristic values of the same picture extracted at each of the points A to D reach the characteristic value comparator 22a. As a result, it is difficult for the characteristic value comparator 22a to compare the each other's characteristic values by receiving the characteristic values from the points A to D at each arrival time.

According to the present embodiment, there is provided means for comparing the each other's characteristic values from the points A to D in high precision, even if it is difficult to know in advance when the characteristic values extracted for the same picture from the characteristic value extracting units 11 to 14 reach the characteristic value comparator 22a.

Figure 3:
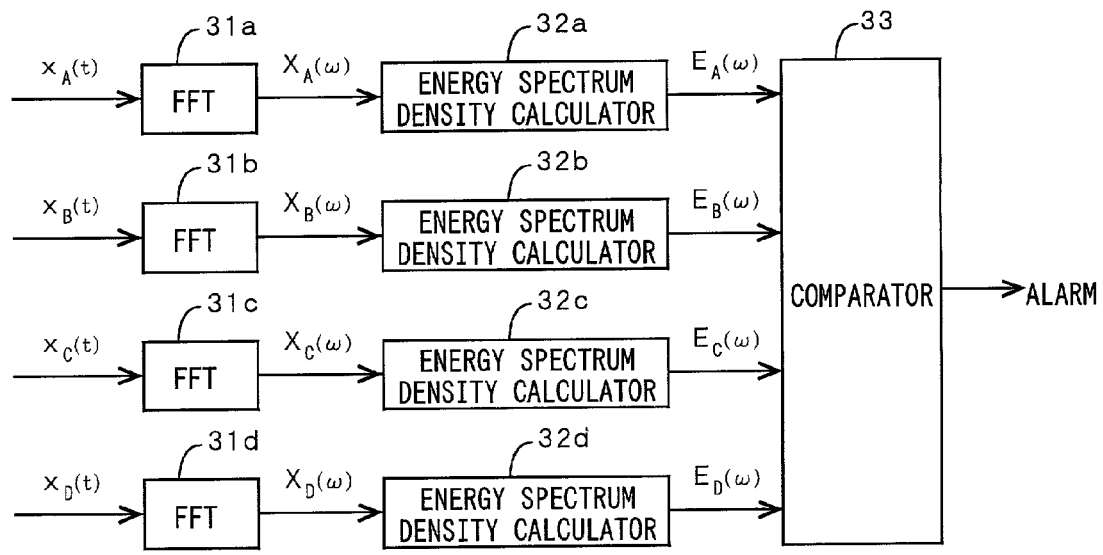
FIG. 3 is a block diagram showing a function of a characteristic value comparator according to one embodiment of the present invention.
Figure 4A:
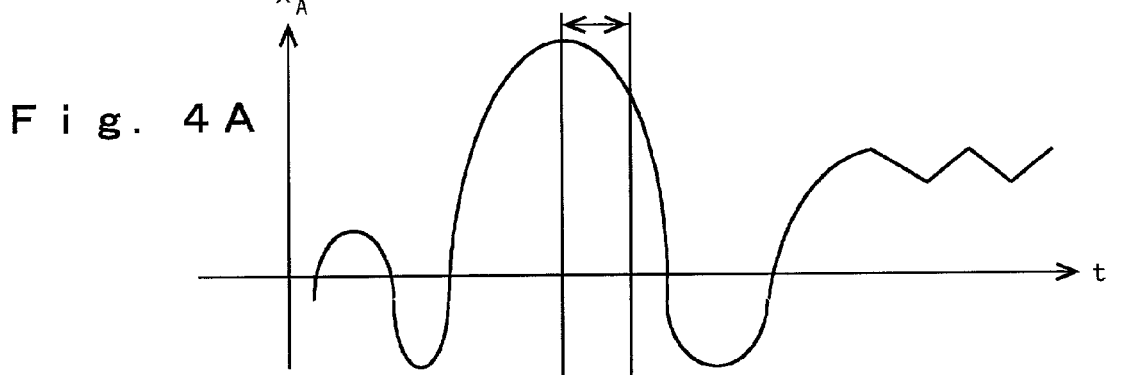
FIGS. 4A and 4B are diagrams showing an example of a series of characteristics at points A and B respectively.
Figure 4B:
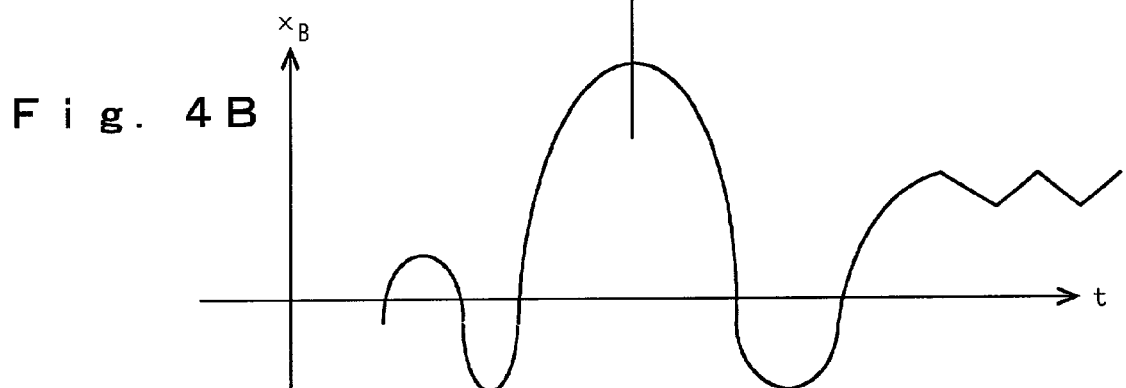

FIG. 3 is a block diagram showing an example of a structure of the characteristic value comparator 22a according to the present embodiment. A series of characteristic values (time changes) $X_A(t)$, $X_B(t)$, $X_C(t)$ and $X_D(t)$ extracted by the characteristic value extracting units 11 to 14 and transmitted to the characteristic value comparator 22a via the low-speed line 21 are input to the characteristic value comparator 22a. FIG. 4A shows the characteristic value $X_A$ (t) at a point A of the input side of the TSC unit 1. FIG. 4B shows the characteristic value $X_B$ (t) at a point B of the output side of the TSC unit 1. When the degraded level of the picture quality at the TSC unit 1 is small, there is only a time delay t0 between the $X_A$ (t) and the $X_B$ (t), and these have substantially the same waveforms.

As shown in FIG. 3, the characteristic value comparator 22a consists of circuits having FFTs (Fourier transformers) 31a to 31d for frequency-converting time-series data and energy spectrum density calculators 32a to 32d connected in series respectively, and a comparator 33 connected to the outputs of the energy spectrum density calculators 32a to 32d.

The FFTs 31a to 31d and the energy spectrum density calculators 32a to 32d carry out the same operation respectively. Therefore, the functions of the FFT 31a and the energy spectrum density calculator 32a will be explained respectively as representative units.

The FFT 31a carries out a Fourier transformation to the series $X_A(t)$ of the characteristic value based on the following expression (1), and obtains a Fourier transform value $X_A$ ($\omega$).

$$X_A(\omega) = \int_{-\infty}^{\infty} x_A(t)e^{-j\omega t} dt \tag{1}$$

Next, the energy spectrum density calculator 32a calculates an energy spectrum density $E_A$ ($\omega$) using the Fourier transform value $X_A$ ($\omega$) based on the following expression (2).

$$E_A(\omega) = X_A(\omega)\overline{X_A(\omega)} \tag{2}$$

The energy spectrum density $E_A$ ($\omega$) has a characteristic that is not influenced deviation on the time axis. In other words, only the arrival time of the characteristic value from the point B is delayed by the time t0 from the point A. When the contents of the characteristic values are the same, the energy spectrum density $E_A$ ($\omega$) becomes equal to the energy spectrum density $E_B$ ($\omega$).

Next, the comparator 33 calculates a difference between the output from the energy spectrum density calculator 32a and 32b, based on the following expression (3). When the difference exceeds a predetermined threshold value Z, the comparator 33 generates an alarm.

$$\int_{-\infty}^{\infty} |E_A(\omega) - E_B(\omega)| d\omega \geq Z \tag{3}$$

As explained above, according to the present embodiment, it is possible to assess the picture quality of a picture on the transmission path. Further, it is also possible to monitor an occurrence of an abnormality on the transmission path. Further, it is also possible to compare the characteristic values between a point before and a point after a transmission processing unit disposed on the transmission path. In other words, it is possible to compare the characteristic values between the input and the output of the transmission processing unit. Therefore, it becomes possible to specify a point where an abnormality has occurred.

While the above embodiment explains an example of the picture transmission chain having a plurality of transmission processing units connected in series to the transmission path, the present invention is not limited to this. It is needless to mention that the picture quality of a picture in transmission can be assessed in a simple system having an encoder and a decoder for an original picture. In this system, a characteristic value of the picture is extracted at a point of the input side of the encoder, and at a point of the output side of the decoder. Both characteristic values are compared to assess the picture quality.

As explained above, according to the present invention, it is possible to assess the picture quality of the transmission picture by using characteristic values of the picture in a small volume of information.

Further, in the course of a transmission of an original picture, the characteristic values of the original picture are extracted. These characteristic values are transmitted to the central monitoring unit using a low-speed line. Then, the central monitoring unit checks whether there has been a change in the characteristic values that have been extracted at various points in the course of the transmission. Therefore, it is possible to assess the picture quality of the transmission picture in high precision during the actual transmission of the picture.

Further, the characteristic values of the picture extracted from various points are handled as time-series data. These time-series data are frequency-converted, and their amplitude components are obtained. These amplitude components are compared to detect an abnormality in the picture quality. Therefore, even if a processing delay of a certain transmission processing unit is unknown, it is possible to compare the picture quality of the transmission picture. As a result, it is possible to easily realize an automatic remote monitoring of picture quality of a picture in transmission.

What is claimed is:

1. An apparatus for assessing quality of a picture in transmission on a picture transmission path having a plurality of transmission processing units connected in series, the apparatus comprising:

means for extracting characteristic values of a picture transmitted on the picture transmission path at predetermined points on the picture transmission path, wherein the apparatus assesses the picture quality of the picture based on the characteristic values of the picture, wherein the apparatus does not require that the characteristic values, which are extracted from the picture transmission path, be reinserted back into the picture transmission path, and wherein the apparatus does not require that characteristic values extracted at one of the predetermined points be delayed in time for synchronization to match characteristic values extracted at another of the predetermined points.

2. An apparatus for remote-monitoring quality of a picture in transmission that monitors quality of a picture in transmission on a picture transmission path having a plurality of transmission processing units connected in series, the apparatus comprising:

means for extracting characteristic values of a picture transmitted on the picture transmission path at predetermined points on the picture transmission path;

transmission means for transmitting characteristic values extracted by the characteristic value extracting means, from each of the points to a central monitoring unit at a low bit rate; and the central monitoring unit for deciding whether an abnormality has occurred in the picture quality or not, based on the characteristic values transmitted from the respective points by the transmission means, wherein the apparatus does not require that characteristic values extracted at one of the predetermined points be delayed in time for synchronization to match characteristic values extracted at another of the predetermined points.

3. An apparatus for remote-monitoring picture quality of a picture in transmission that monitors quality of a picture in transmission on a picture transmission path having a plurality of transmission processing units connected in series, the apparatus comprising:

means for extracting characteristic values of a picture transmitted on the picture transmission path at predetermined points on the picture transmission path;

transmission means for transmitting characteristic values extracted by the characteristic value extracting means, from each of the points to a central monitoring unit at a low bit rate; and the central monitoring unit for deciding whether an abnormality has occurred in the picture quality or not, based on the characteristic values transmitted from the respective points by the transmission means, wherein the central monitoring unit comprises:

means for handling the characteristic values as time-series data, and frequency-converting the time-series data;

means for extracting amplitude components from the data obtained by the frequency conversion; and means for comparing the characteristic values between a plurality of points, based on a comparison of the amplitude components.

4. The apparatus for remote-monitoring picture quality of a picture in transmission according to claim 2, wherein said transmission means is one of a telephone network, a LAN and an IP network.

* * * * *